(12) United States Patent
Foster et al.

(10) Patent No.: US 7,214,165 B2
(45) Date of Patent: May 8, 2007

(54) METHOD OF AUTOMATICALLY FLUSHING DEBRIS FROM AN ELECTRICALLY-OPERATED HYDRAULIC VALVE

(75) Inventors: Michael D. Foster, Carmel, IN (US); Tung-Ming Hsieh, Carmel, IN (US); Gregory A. Hubbard, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 204 days.

(21) Appl. No.: 10/846,139

(22) Filed: May 14, 2004

(65) Prior Publication Data

US 2005/0255967 A1 Nov. 17, 2005

(51) Int. Cl.
*B60W 10/02* (2006.01)
(52) U.S. Cl. .................. 477/174; 477/125; 477/127; 477/906; 192/85 R; 137/15.06; 475/116
(58) Field of Classification Search ................ 477/125, 477/127, 138, 174, 906; 475/116, 125, 128; 192/85 R; 137/15.04, 15.05, 15.06, 238, 137/239
See application file for complete search history.

(56) References Cited

U.S. PATENT DOCUMENTS

| | | | |
|---|---|---|---|
| 4,981,155 A * | 1/1991 | Pick et al. .................. 137/238 |
| 4,996,894 A * | 3/1991 | Holbrook et al. .............. 477/62 |
| 6,015,031 A * | 1/2000 | Dorfschmid et al. ........ 192/3.58 |
| 6,170,506 B1 * | 1/2001 | Butwin et al. .................. 137/2 |
| 6,860,284 B2 * | 3/2005 | Wuerth et al. ........... 137/15.06 |

FOREIGN PATENT DOCUMENTS

WO    WO 205048 A1 *    1/2002

\* cited by examiner

*Primary Examiner*—David D. Le
(74) *Attorney, Agent, or Firm*—Dan L. Thompson

(57) ABSTRACT

The normal control of an electrically-activated hydraulic valve armature is overridden to automatically and periodically open the armature for flushing out debris that has accumulated between the armature and a seat that the armature is designed to engage. The valve develops fluid pressure for maintaining engagement of a motor vehicle transmission clutch, and when excessive slippage of the clutch is detected, the armature is forced into engagement with the seat until the slippage is reduced or a predetermined period of time has elapsed, after which the armature is temporarily positioned away from the seat to provide full flow of hydraulic fluid across the seat to flush out debris that prevents the armature from engaging the seat. During Neutral operation of the transmission, the armature is continuously positioned away from the seat, and during low torque conditions the armature is temporarily positioned away from the seat.

9 Claims, 3 Drawing Sheets

METHOD OF AUTOMATICALLY FLUSHING DEBRIS FROM AN ELECTRICALLY-OPERATED HYDRAULIC VALVE

TECHNICAL FIELD

The present invention is related to the control of an electrically-activated hydraulic valve for regulating fluid pressure in a motor vehicle transmission, and more particularly to a method of preventing erroneous operation of the valve due to accumulation of debris.

BACKGROUND OF THE INVENTION

In motor vehicle transmissions having hydraulically-engaged clutches (or other friction devices), it is desirable to regulate the clutch pressure to a value that is sufficient to prevent clutch slippage without being unnecessarily high. This can be achieved with a hydraulic circuit including a hydraulic pressure regulator valve and an electrically-operated boost valve that supplies a bias or boost pressure to the regulator valve. The relationship between the boost pressure and the clutch pressure can be established by a way of a look-up table, for example, and once the desired clutch pressure is known, the transmission controller can use the look-up table to determine the corresponding boost pressure. In a typical mechanization, the boost valve receives input hydraulic fluid which is either directed to the pressure regulator valve or exhausted to a fluid reservoir. The exhaust of fluid flow within the valve is determined by the position of an armature with respect to a seat, and a solenoid coil surrounding the armature is variably activated to position the armature.

It has been found that very fine debris normally present in filtered hydraulic transmission fluid can accumulate in the boost valve and prevent proper valve operation. In particular, the debris can accumulate between the armature and the valve seat under conditions where the armature is positioned very close the seat. The accumulation of debris then prevents the armature from engaging the seat when conditions so require, causing the produced boost pressure, and therefore the clutch pressure, to deviate from the desired value. Depending on the design of the valve, the erroneous clutch pressure can result in clutch slippage and other harmful consequences. Accordingly, what is needed is a way of preventing erroneous operation of the boost valve due to accumulation of debris without noticeably affecting the operation of the transmission.

SUMMARY OF THE INVENTION

The present invention is directed to an improved method of operation for an electrically-activated hydraulic valve of a motor vehicle transmission, where a normal activation of the valve is overridden to automatically and periodically open an armature of the valve to flush out debris that has accumulated between the armature and a seat that the armature is designed to engage. In a preferred implementation, the electrically-activated valve and a pressure regulator valve develop fluid pressure for maintaining engagement of one or more hydraulically-activated torque transmitting devices (i.e., clutches), and maximum clutch pressure is produced when the armature engages the seat. When excessive slippage of a clutch is detected, the armature is forced into engagement with the seat until the slippage is reduced or a predetermined period of time has elapsed, after which the armature is temporarily positioned away from the seat to provide full flow of hydraulic fluid across the seat to flush out debris that prevents the armature from engaging the seat. During Neutral operation of the transmission, the armature is continuously positioned away from the seat to provide full flow of hydraulic fluid across the seat for keeping the seat free of debris, and during low torque and speed operating conditions of the transmission, the armature is periodically positioned away from the seat for a predetermined interval to provide full flow of hydraulic fluid across the seat to flush out any accumulated debris.

DESCRIPTION OF THE PREFERRED EMBODIMENT

Figure 1:
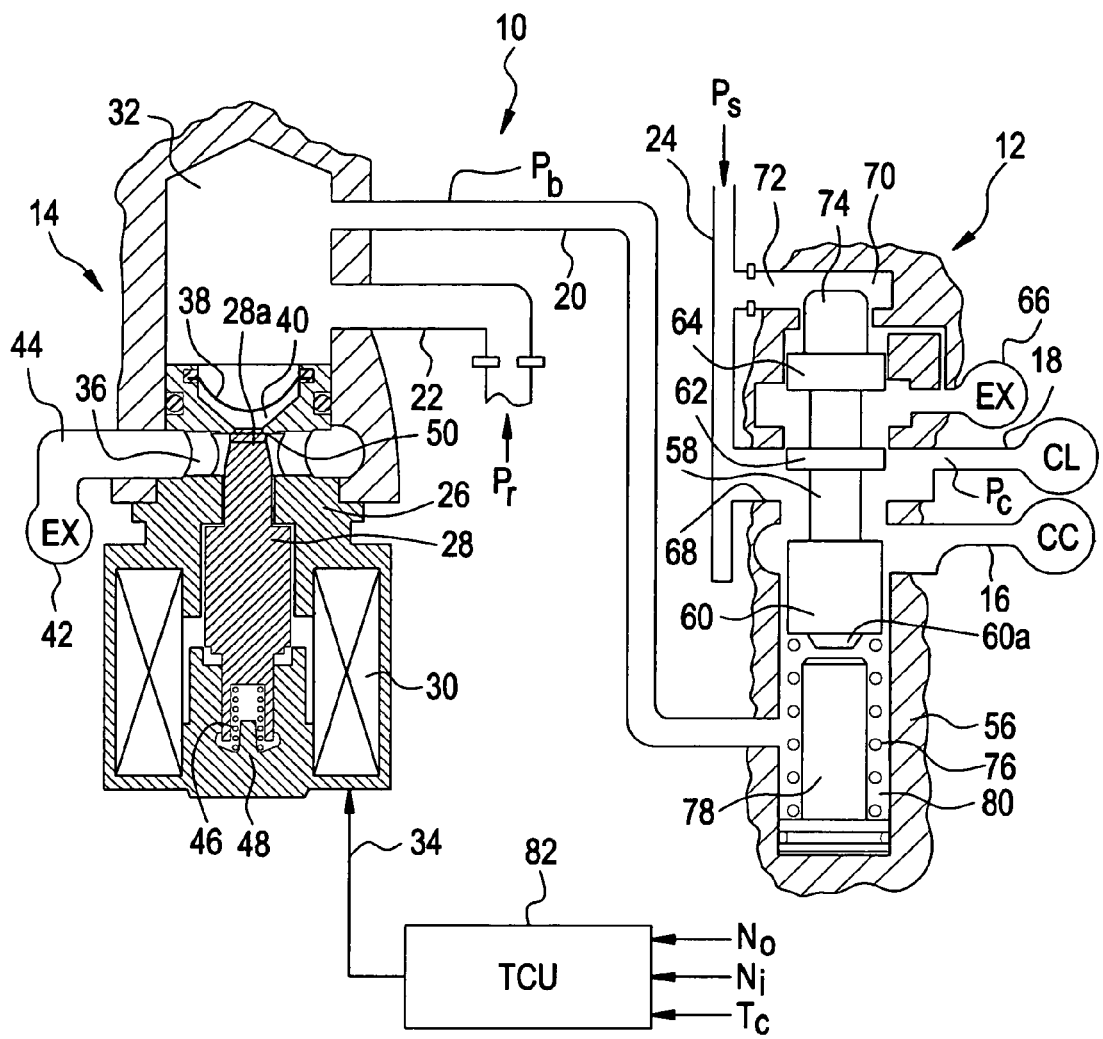
FIG. 1 is a mechanical hardware schematic representation of a pressure regulator hydraulic circuit for a motor vehicle transmission, including an electrically-activated boost valve and a microprocessor-based transmission control unit (TCU)

Referring to FIG. 1, the reference numeral 10 generally designates a hydraulic pressure regulation circuit of a motor vehicle transmission, including a hydraulically-activated pressure regulator valve (PRV) 12 and an electrically-activated boost pressure valve (BPV) 14. The PRV 12 supplies hydraulic fluid to a cooler circuit (CC) via line 16 and regulates a clutch pressure (Pc) in line 18 for at least one hydraulically-engaged clutch CL. The BPV 14 supplies a boost pressure Pb to PRV 12 via line 20. The boost pressure Pb is derived from a reference pressure Pr supplied to BPV 14 via flow restricted line 22, while the cooler circuit fluid and clutch pressure Pc are derived from a pump supply pressure Ps in line 24. Of course, the PRV 12 and BPV 14 may be combined into a single valve if desired.

The BPV 14 includes a valve body 26, an armature 28, a solenoid coil 30 and a valve chamber 32 to which lines 20 and 22 are coupled. The solenoid coil 30 is electrically activated via conductor 34 to position the armature 28 within the valve body 26 so that some or all of the hydraulic fluid entering valve chamber 32 via line 22 is directed to an outlet port 36 through a screen 38 and a valve body opening 40 that is axially aligned with the armature 28. The outlet port 36 is coupled to a fluid exhaust 42 via line 44. A spring 46 disposed about a post 48 of valve body 26 biases the armature 28 toward the opening 40, while electrical activation of the solenoid coil 30 produces an electromagnetic force that opposes the spring force for moving the armature 28 away from the opening 40. The magnitude of the solenoid coil current determines the magnitude of the resulting electromagnetic force, and the armature 28 may be moved to a desired position within the valve body 26 simply by controlling the solenoid current.

The lineal position of armature 28 within the valve body 26 determines the boost pressure Pb in valve chamber 32 and line 20. When the armature is positioned as shown in FIG. 1 with its inboard end 28a pressed against a seat 50 defined by the surface portions of valve body 26 adjacent the opening 40, none of the fluid supplied to valve chamber 32 via line 22 passes to outlet port 36, and Pb is essentially equal to the reference pressure Pr. This condition occurs when no current is supplied to solenoid coil 30. The opposite condition occurs when full current is supplied to the solenoid coil 30 to fully retract the armature 28 from the opening 40. In this case, essentially all of the fluid supplied to valve chamber 32 via line 22 is exhausted through opening 40, and Pb is essentially equal to zero. When the solenoid coil 30 is energized at intermediate current levels, the armature 28 partially restricts fluid flow through the opening 40, and Pb can be controlled to any value between zero and Pr.

Figure 2:
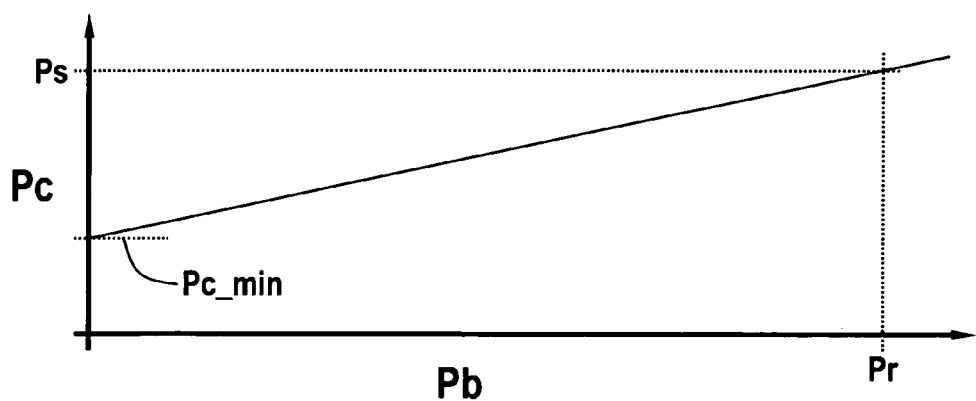
FIG. 2 is a graph depicting a relationship between a boost pressure developed by the boost valve of FIG. 1 and a clutch pressure developed by the hydraulic circuit of FIG. 1.

The PRV 12 includes a valve body 56 and a spool-type valve element 58 having spaced lands 60, 62 and 64. Fluid between the lands 60 and 62 is supplied to cooler circuit CC and clutch CL via lines 16 and 18, and fluid between lands 62 and 64 is directed to fluid exhaust 66. The pump supply pressure Ps in line 24 is coupled to an inlet port 68 and to a bias chamber 70 via flow restricted line 72. The pressure Ps in bias chamber 70 acts on the end 74 of valve element 58, producing a downward force that is countered by the upward force of a spring 76 disposed about a post 78 in valve chamber 80. The spring 76 is designed so that in the absence of any boost pressure Pb in line 20, the valve element 58 will be positioned to regulate the clutch pressure Pc in line 18 to a predetermined minimum value, referred to herein as Pc_min. When the supply of fluid to line 24 is relatively low (i.e., at low pump speeds), the valve element 58 is positioned essentially as shown in FIG. 1, with the clutch pressure Pc being regulated by varying the fluid flow to the cooler circuit CC via line 16. When the supply of fluid to line 24 is relatively high (i.e., at high pump speeds), the cooler circuit (CC) becomes flow limited, and resulting pressure increase in bias chamber 70 pushes valve element 58 downward; this allows a portion of the fluid supplied to inlet port 68 to pass to exhaust 66 so that the clutch pressure Pc remains regulated at the predetermined value Pc_min. Boost pressure Pb in line 20 is directed to the valve chamber 80 in which spring 76 is disposed, and effectively increases the spring force to increase the regulated clutch pressure Pc. This relationship is graphically depicted in FIG. 2, which shown the clutch pressure Pc as a function of boost pressure Pb. When the solenoid coil 30 of BPV 14 is fully energized so that the boost pressure Pb is zero, Pc is regulated at the predetermined minimum value Pc_min. When the solenoid coil 30 is deenergized so that Pb is essentially equal to Pr, Pc is regulated at a maximum value, essentially equal to the pump supply pressure Ps. When the solenoid coil 30 is partially energized so that Pb is intermediate zero and Pr, Pc is regulated to a corresponding value intermediate Pc_min and Ps as illustrated in FIG. 2.

FIG. 1 additionally depicts a microprocessor-based transmission control unit (TCU) 82 for carrying out various transmission control functions, including the appropriate energization of the solenoid coil 30 of BPV 14. Various inputs used in the performance of this functionality, and/or according to the method of this invention, include the transmission input and output speeds Ni and No, and the output torque command Tc. The speeds Ni and No may be measured with suitable speed transducers (not shown), and the output torque command Tc may be based on driver accelerator pedal position, for example. In general, the above inputs may be used along with the transmission range and clutch parameters to determine the required clutch pressure Pc, which is used in turn to determine the required boost pressure Pb using a stored relationship such as depicted by the graph of FIG. 2. Alternately, the boost pressure Pb may be determined directly. In any event, the TCU 82 can then determine a solenoid coil current corresponding to the required value of Pb, and energize the solenoid coil 30 accordingly using either a PWM or linear current control.

As discussed above, small debris particles normally present in filtered transmission hydraulic fluid can pass through the screen 38 and lodge in the area 50 of BPV valve body 26 where the end 28a of armature 28 seats to close the opening 40. This most generally occurs during high torque conditions where the energization of the solenoid coil 30 is very low and the gap between armature 28 and seat 50 is very small. The debris can accumulate on the seat area and/or on the portions of armature 28 that normally contact the seat 50, and in any case can prevent armature 28 from fully closing the opening 40 when maximum clutch pressure is required. In such a case, unintended fluid flow around the end 28a of armature 28 produces an undesired reduction in Pb, and hence Pc. Slippage of the clutch CL can result, which of course is a detrimental operating condition that should not be permitted. While the TCU 82 can detect the unintended clutch slippage using the input and output speeds Ni and No (or other suitable speed measurements) and limit the transmission input torque to prevent transmission damage, the actual cause of the problem (i.e., the accumulated debris) can be difficult and time consuming to diagnose and correct, and may recur soon afterward.

The present invention addresses the above-described problem in three ways, each of which flushes fluid through the opening 40 for cleansing the seat area 50 of any accumulated debris. Under no torque (i.e., neutral) conditions, Pb is commanded to zero to continually flush fluid through the opening 40. Under low torque conditions, Pb is periodically commanded to zero for a predetermined interval to temporarily increase the fluid flow through the opening 40. And under high torque conditions with clutch slippage, Pb commanded to a maximum value until the slippage is reduced or a predetermined period of time has elapsed, after which Pb is temporarily commanded to zero to flush out any debris preventing the armature 28 from engaging the seat 50.

Figure 3:
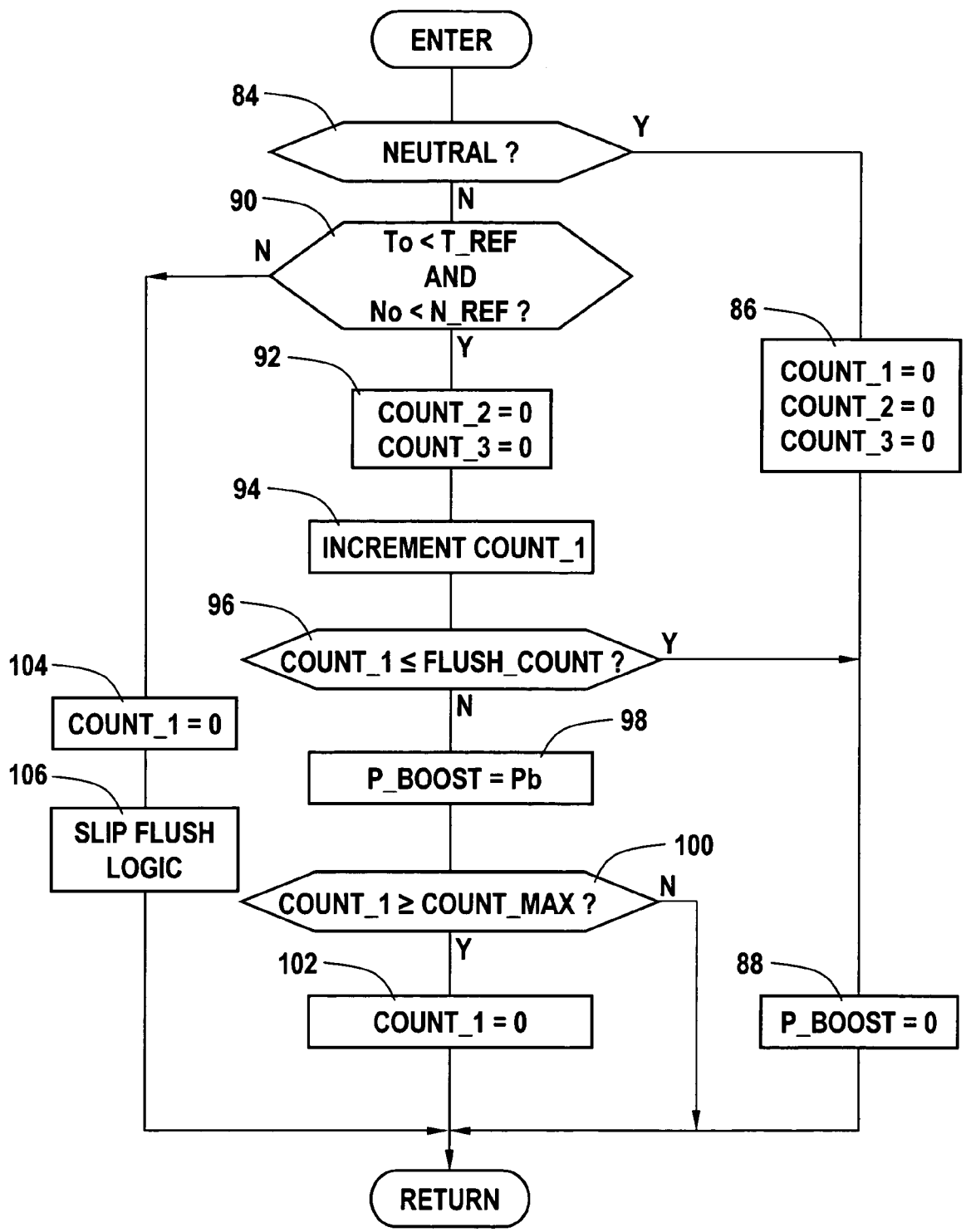
FIG. 3 illustrates a flowchart of exemplary steps in a software routine executed by the TCU of FIG. 1 according to the present invention.
Figure 4:
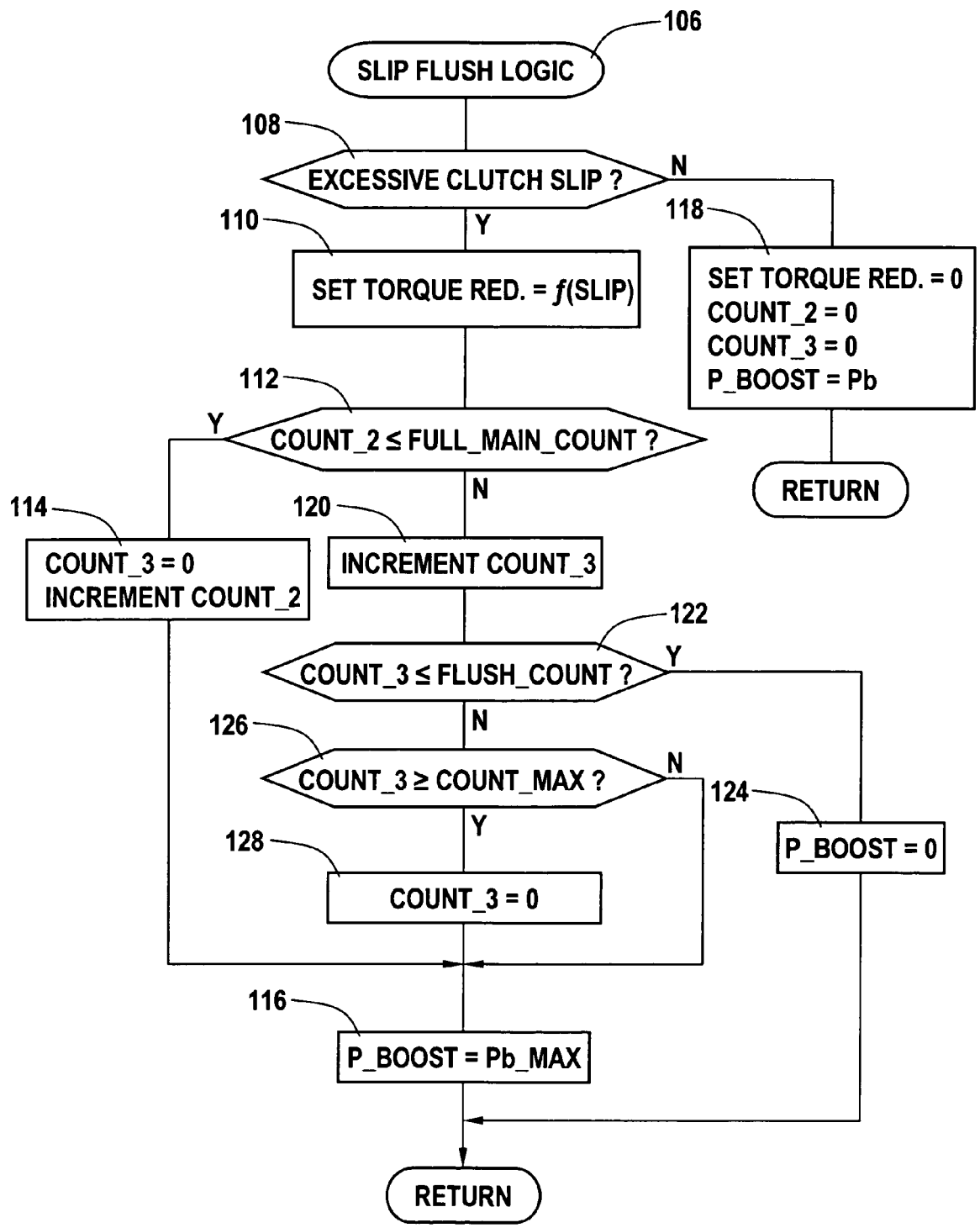
FIG. 4 illustrates a flowchart detailing a portion of the flowchart of FIG. 3 pertaining to flushing out accumulated debris from the boost valve in the presence of excessive clutch slippage.

The TCU 82 carries out the above-described functionality by periodically executing a software routine such as represented by the flow chart of FIGS. 3–4 during vehicle operation. The routine has access to a calculated or required boost pressure Pb, and determines a boost pressure command P_BOOST from which the BPV solenoid coil current is determined.

Referring to FIG. 3, the block 84 is initially executed to determine if the transmission is in a Neutral range. If so, the blocks 86 and 88 reset first, second and third counter variables COUNT_1, COUNT_2 and COUNT_3 to zero, and set P_BOOST to zero, completing the routine. This fully retracts the BPV armature 28 to provide full and continuous fluid flow across the seat 50 and armature portion 28a for keeping the area free of debris.

If the transmission is not in a Neutral range, the block 90 is executed to determine if the transmission output torque To (a commonly computed value in transmission control) is less than a reference low torque T_REF such as 300 Nm and the transmission output speed No is less than a speed reference N_REF such as 100 RPM. If so, clutch slippage is considered to be very unlikely, and the routine temporarily sets P_BOOST to zero to flush out the BPV 14. First, the blocks 92 and 94 reset the second and third counter variables COUNT_2 and COUNT_3 to zero, and increment the first counter variable COUNT_1. The block 96 then compares COUNT_1 to a reference value FLUSH_COUNT. Initially, COUNT_1<=FLUSH_COUNT, and the block 88 is executed as described above to set P_BOOST to zero, completing the routine. After a predetermined period of time, such as 200 msec for example, periodic incrementing of COUNT_1 will cause it to exceed FLUSH_COUNT. At such point, block 96 is answered in the negative, and the block 98 sets P_BOOST to the calculated value Pb. The block 100 then compares COUNT_1 to a reference value COUNT_MAX, which may be several multiples of FLUSH_COUNT. When the periodic incrementing of COUNT_1 by block 94 causes it to exceed COUNT_MAX, the block 102 resets COUNT_1 to zero. In this way, hydraulic fluid is periodically flushed through the BPV 14 during extended low torque operation.

If the transmission output torque To is at least as great as T_REF and/or the transmission output speed No is at least as great as N_REF, the required clutch torque transmission is sufficiently great that there is a potential for clutch slippage if an accumulation of debris prevents the BPV armature 28 from fully closing the exhaust opening 40. In this case, block 90 of FIG. 3 is answered in the negative, and the blocks 104 and 106 are executed to reset COUNT_1 to zero and to carry out the slip flush logic detailed in the flow diagram of FIG. 4.

Referring to FIG. 4, the block 108 is first executed to determine if there is excessive clutch slippage. The clutch slippage may be determined, for example, based on the input and output speeds Ni and No, and the speed ratio provided by the transmission. If the slippage exceeds a reference value, it is considered to be excessive, and the block 110 is executed to command a reduction in the transmission input torque while the remainder of the slip flush logic attempts to correct the slippage by alternately commanding P_BOOST to zero and full pressure. As indicated at block 110, the amount of input torque reduction is determined as a direct function of the determined clutch slip. Following the execution of block 110, the block 112 compares COUNT_2 to a reference value FULL_MAIN_COUNT. Initially, COUNT_2 will be zero, and the blocks 114 and 116 are executed to reset COUNT_3 to zero, to increment COUNT_2, and to set P_BOOST to a maximum value Pb_MAX (corresponding to reference pressure Pr), completing the routine. Setting P_BOOST to Pb_MAX allows the spring 46 of PBV 14 to force the armature 28 against the seat 50 for applying full available pressure to the clutch CL in an attempt to reduce the clutch slippage. If the clutch slippage is in fact reduced, the block 118 is executed to set the input torque reduction to zero, to reset COUNT_2 and COUNT_3 to zero, and to set P_BOOST to the calculated value Pb. However, if the clutch slippage remains excessive despite setting P_BOOST to Pb_MAX, periodic incrementing of COUNT_2 by block 114 will cause it to exceed FULL_MAIN_COUNT after an interval of 20 sec, for example. At such point, block 112 is answered in the negative, and the blocks 120 and 122 increment COUNT_3 and compare COUNT_3 to the reference value FLUSH_COUNT. Initially, COUNT_3 is zero, and the block 124 is executed to set P_BOOST to zero, completing the routine. Setting P_BOOST to zero permits maximum fluid flow through the PBV exhaust opening 40 in an attempt to flush any accumulated debris from the seat 50 and the end 28a of the armature 28. However, after a brief duration such as 200 msec, the periodic incrementing of COUNT_3 by block 120 will cause COUNT_3 to exceed FLUSH_COUNT. At such point, the block 116 is executed to set P_BOOST back to the maximum value Pb_MAX. Also, the block 126 compares COUNT_3 to the reference value COUNT_MAX, which may be several multiples of FLUSH_COUNT. When the periodic incrementing of COUNT_3 by block 120 causes it to exceed COUNT_MAX, the block 128 resets COUNT_3 to zero. In this way, P_BOOST is alternately set to Pb_MAX and zero for predetermined intervals so long as excessive clutch slippage persists. If and when the clutch slippage is corrected, the block 118 is executed as described above to set the input torque reduction to zero, to reset COUNT_2 and COUNT_3 to zero, and to set P_BOOST to the calculated value Pb.

In summary, the method of the present invention automatically and periodically opens the PBV armature 28 to flush out debris that has accumulated on the armature 28 and the valve seat 50. When excessive slippage of a clutch is detected, the armature 28 is forced into engagement with the seat 50 until the slippage is reduced or a predetermined period of time has elapsed, after which the armature 28 is temporarily positioned away from the seat to provide full flow of hydraulic fluid across the seat 50 to flush out debris that prevents the armature 28 from engaging the seat 50. During Neutral operation of the transmission, the armature 28 is continuously positioned away from the seat 50 to provide full flow of hydraulic fluid across the seat 50 for keeping the area free of debris, and during low torque and speed operating conditions of the transmission, the armature 28 is temporarily positioned away from the seat 50 to provide full flow of hydraulic fluid across the seat 50 to flush out any accumulated debris. The various flushing events do not noticeably affect the operation of the transmission, and at the same time automatically prevent and/or correct erroneous operation of the transmission due to accumulation of debris in PBV 14.

While this invention has been described with respect to the illustrated embodiment, it is recognized that numerous modifications and variations in addition to those mentioned herein will occur to those skilled in the art. For example, the various time intervals given herein are exemplary in nature, the input and output parameters may vary from those described, and so on. Accordingly, it is intended that the invention not be limited to the disclosed embodiment, but that it have the full scope permitted by the language of the following claims.

The invention claimed is:

1. A method of operation for a hydraulic valve of a motor vehicle transmission, where the valve includes an armature and seating surface defining a fluid passage, and a solenoid coil activated to position the armature for variably allowing or blocking fluid flow through the passage, wherein the hydraulic valve controls development of a clutch pressure for maintaining engagement of a transmission clutch, the method comprising:
   detecting a neutral condition of said transmission;
   continuously overriding a normal activation of the solenoid coil to position said armature away from said seating surface when said neutral condition is detected, thereby permitting a full fluid flow through said passage for flushing out debris accumulated on the armature and said seating surface that the armature must engage to block fluid flow through said passage.

2. A method of operation for a hydraulic valve of a motor vehicle transmission, where the valve includes an armature and seating surface defining a fluid passage, and a solenoid coil activated to position the armature for variably allowing or blocking fluid flow through the passage, wherein the hydraulic valve controls development of a clutch pressure for maintaining engagement of a transmission clutch, the method comprising:

detecting a low torque operating condition of said transmission for which slippage of said clutch is considered to be unlikely;

temporarily overriding a normal activation of said solenoid coil to position said armature away from said seating surface when said low torque operation condition is detected, thereby permitting a full fluid flow through said passage for flushing out debris accumulated on the armature and said seating surface that the armature must engage to block fluid flow through said passage.

3. A method of operation for a hydraulic valve of a motor vehicle transmission, where the valve includes an armature and seating surface defining a fluid passage, and a solenoid coil activated to position the armature for variably allowing or blocking fluid flow through the passage, wherein the hydraulic valve controls development of a clutch pressure for maintaining engagement of a transmission clutch, the method comprising:

detecting an excessive slip condition of said clutch; and temporarily overriding a normal activation of said solenoid coil to position said armature away from said seating surface when said excessive slip condition is detected, thereby permitting a full fluid flow through said passage for flushing out debris accumulated on the armature and said seating surface that the armature must engage to block fluid flow through said passage.

4. The method of claim 3, including the step of:

commanding a reduction of input torque to said transmission when said excessive slip condition is detected.

5. A method of operation for a hydraulic valve of a motor vehicle transmission, where the valve includes an armature and seating surface defining a fluid passage, and a solenoid coil activated to position the armature for variably allowing or blocking fluid flow through the passage, wherein the hydraulic valve controls development of a clutch pressure for maintaining engagement of a transmission clutch, the method comprising:

detecting an excessive slip condition of said clutch; and so long as said excessive slip condition is detected, overriding a normal activation of said solenoid coil to alternately position said armature into engagement with said seating surface and away from said seating surface, thereby permitting a full fluid flow through said passage when said armature is positioned away from said fluid passage for flushing out debris accumulated on the armature and said seating surface that the armature must engage to block fluid flow through said passage.

6. The method as claimed in claim 5, including the step of:

commanding a reduction of input torque to said transmission so long as said excessive slip condition is detected.

7. A method of operation for a hydraulic valve of a motor vehicle transmission, where the valve includes an armature and seating surface defining a fluid passage, and a solenoid coil activated to position the annature for variably allowing or blocking fluid flow through the passage, wherein the hydraulic valve controls development of a clutch pressure for maintaining engagement of a transmission clutch, the method comprising:

detecting an excessive slip condition of said clutch; and overriding a normal activation of said solenoid coil to position said armature into engagement with said seating surface until said excessive slip condition is no longer detected or a predetermined time interval has elapsed; and overriding the normal activation of said solenoid coil to temporarily position said armature away from said seating surface if said predetermined time interval has elapsed and said excessive slip condition is still detected, thereby permitting a full fluid flow through said passage when said armature is positioned away from said seating surface for flushing out debris accumulated on the armature and said seating surface that the armature must engage to block fluid flow through said passage.

8. The method as claimed in claim 7, including the step of:

commanding a reduction of input torque to said transmission so long as said excessive slip condition is detected.

9. The method as claimed in claim 7, including the step of:

periodically and repetitively overriding the normal activation of said solenoid coil to position said armature into engagement with said seating surface and overriding the normal activation of said solenoid coil to temporarily position said armature away from said fluid passage so long as said excessive slip condition is still detected.

* * * * *